United States Patent [19]

Jensen et al.

[11] 4,264,001
[45] Apr. 28, 1981

[54] CONVEYOR WITH ROLLER SUPPORT WORKPIECE HOLDER

[75] Inventors: Frederick K. Jensen, Milford; Robert G. Summers, Howell, both of Mich.

[73] Assignee: Jensen, Inc., Farmington, Mich.

[21] Appl. No.: 53,911

[22] Filed: Jul. 2, 1979

[51] Int. Cl.³ .............................................. B65G 17/16
[52] U.S. Cl. ..................................... 198/344; 198/365
[58] Field of Search ............... 198/344, 365, 377, 378, 198/802, 645

[56] References Cited

U.S. PATENT DOCUMENTS

| 2,844,243 | 7/1958 | Christiansen et al. | 198/802 X |
| 4,078,649 | 3/1978 | Prydtz | 198/365 |
| 4,089,404 | 5/1978 | Venzke | 198/802 X |

FOREIGN PATENT DOCUMENTS 2541244  4/1978  Fed. Rep. of Germany ........... 198/365

*Primary Examiner*—James L. Rowland
*Attorney, Agent, or Firm*—Robert G. Mentag

[57] ABSTRACT

A spindle conveyor system having a continuous conveyor chain, including a plurality of chain plates that are connected by chain pins, movably mounted in an enclosure structure. The conveyor chain is provided with guide rollers. A plurality of carrier blocks are each fixedly secured to the top side of an individual chain plate. A workpiece spindle is rotatably mounted on each of the carrier blocks and adapted to carry a workpiece holder fixture on the upper end thereof. Each of the carrier blocks has guide rollers operatively mounted thereon. Guide plates are mounted in the enclosure structure for guiding engagement with the conveyor chain guide rollers and the carrier block guide rollers.

10 Claims, 6 Drawing Figures

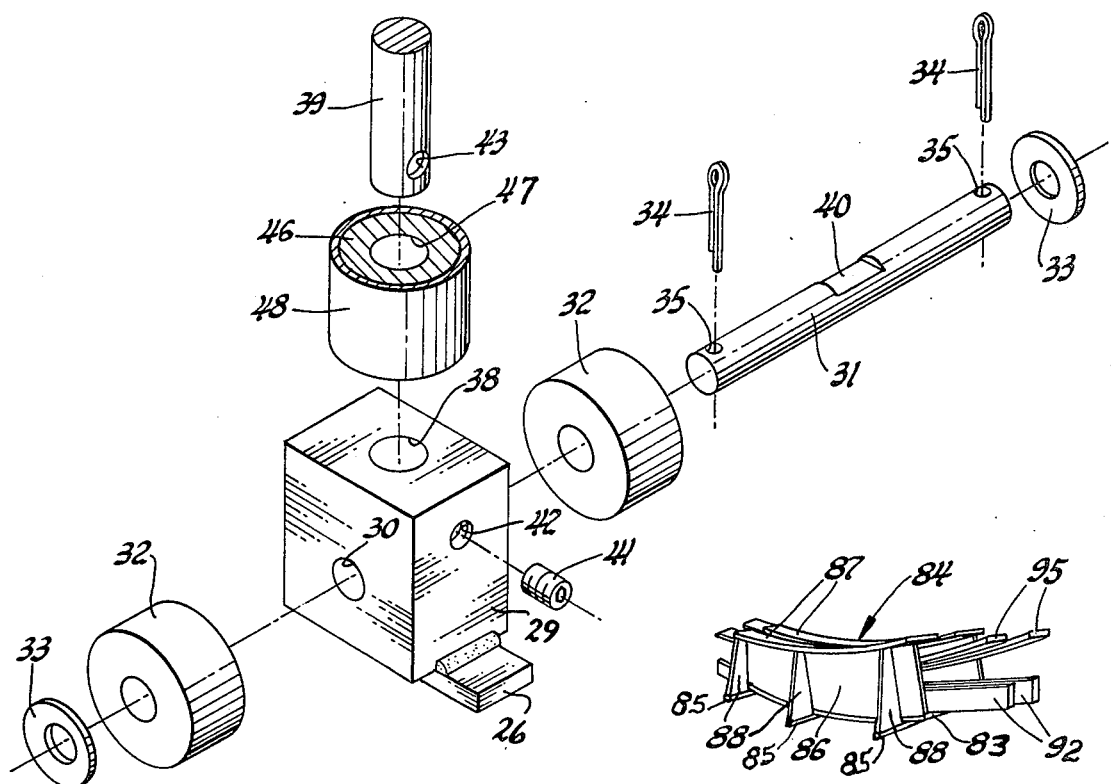
Fig. 4
Fig. 6
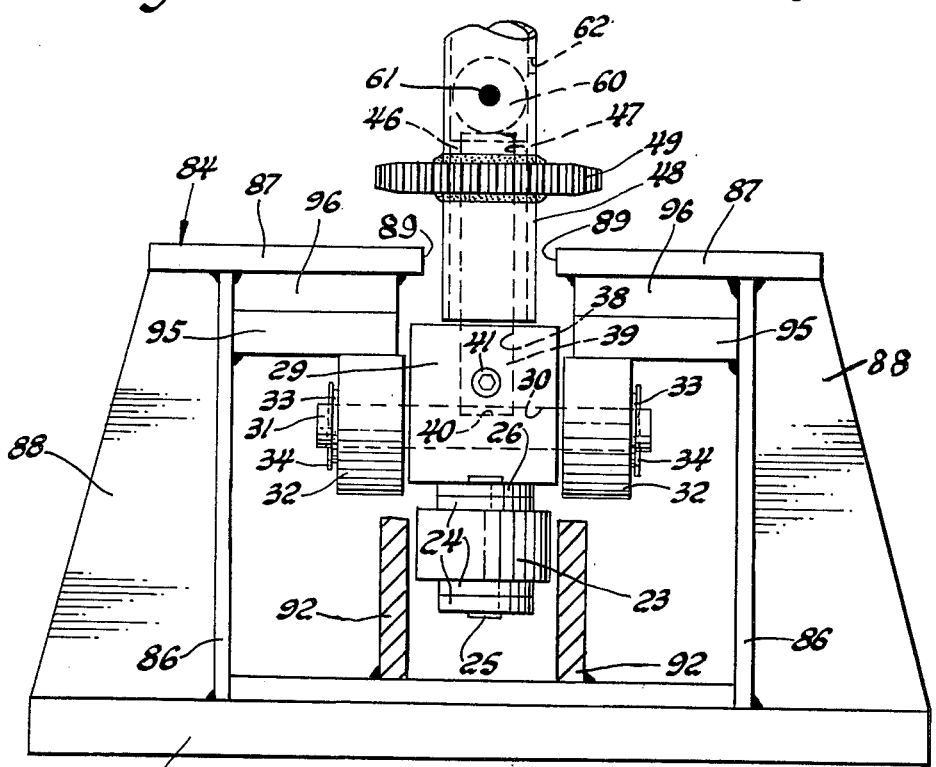
Fig. 5

CONVEYOR WITH ROLLER SUPPORT WORKPIECE HOLDER

BACKGROUND OF THE INVENTION

1. Field of the Invention

This invention relates to the industrial conveyor art, and more particularly, to a novel and improved spindle type conveyor. The invention is specifically concerned with a spindle type conveyor having a plurality of rotatable spindles which carry workpieces through a series of work stations, such as a washing station, a paint station, a bake oven station, a workpiece cooling station, a workpiece unload station, and a workpiece station.

2. Description of the Prior Art

It is well known in the industrial conveyor art to employ conveyors for carrying workpieces through various work stations for operations on the workpieces. It is also well known in the industrial conveyor art to provide spindle conveyors having a plurality of elongated workpiece holding spindle members for carrying workpieces through a series of work stations. Problems encountered with a spindle type conveyor are those of attaching the workpiece carrying spindles to a conveyor chain, and guiding the conveyor chain and the spindles so that the spindles do not wobble. Another problem encountered in spindle type conveyors is that the spindles were mounted on extended pins on the conveyor chain, and such pins were subject to breakage if a spindle became caught in the conveyor system, which would then cause a breakdown and damage to the conveyor system.

In an attempt to overcome such problems, the prior art spindle conveyors employed wear plates and a mating greased track for guiding the conveyor chains. A disadvantage of the last mentioned prior art spindle conveyors is that the wear plates loaded up with dirt, and when they passed through washers the conveyor wear plates would have the grease washed off. In order to overcome the last mentioned problem, separate conveyor systems were used. One conveyor system was used strictly for carrying parts through a washer booth to clean the workpieces. Another conveyor system would be used for carrying the workpieces through a paint booth, and a separate conveyor system for curing the paint coating on the workpieces. Such prior art spindle type conveyors required extra labor for loading and unloading the plurality of conveyors, as well as additional plant space for the conveyors.

SUMMARY OF THE INVENTION

The present invention provides a continuous spindle type conveyor which overcomes the disadvantages of the aforementioned prior art spindle conveyors. The continuous spindle conveyor is constructed and arranged to convey workpieces through a series of work stations such as a workpiece washing station, a workpiece paint coating station, a bake oven station to cure the paint coating on the workpieces, a workpiece unload station, and a workpiece load station.

The spindle conveyor system comprises an elongated enclosure structure which has a longitudinal slot formed through the upper side thereof. A conveyor chain is movably mounted within said enclosure member and provided with a plurality of guide rollers mounted on an axis perpendicular to the longitudinal axis of the enclosure structure. A lower guide means is mounted in the enclosure structure for guiding engagement with the conveyor chain guide rollers. A plurality of carrier blocks are fixedly mounted on the conveyor chain. Each of the carrier blocks is provided with guide rollers mounted on a transverse axis perpendicular to the axis of rotation of the conveyor chain guide rollers and engageable with the lower guide means. Each of the carrier blocks has fixedly mounted thereon a pivot shaft which extends outwardly of the enclosure structure through the longitudinal slot. A workpiece holder spindle is rotatably mounted on each of said pivot shafts, and it is adapted to carry a workpiece holder fixture on the free end thereof. Each rotatable spindle is provided with a peripheral gear for engagement with a means to rotate each of the spindles on their respective pivot shaft. The spindle conveyor elongated enclosure structure is provided with curved lower guide means for the conveyor chain guide rollers, and curved upper guide means for the carrier block rollers, at points of curvature in the conveyor system.

The conveyor structure of the present invention provides a spindle type conveyor system wherein the workpiece spindles are moved in a positive manner without being tilted or the chain conveyor being jammed. The spindle conveyor of the present invention is adapted to maintain the workpiece carrying spindles in a safe and positive work carrying position, regardless of the grade or elevation through which the conveyor is moved, without losing the workpieces carried on the spindles. The guide means provided in the conveyor system of the present invention permits the carrying of workpieces on the top ends of the spindles without the workpieces tipping off.

BRIEF DESCRIPTION OF THE DRAWINGS

FIG. 4 is an exploded view of a carrier block, and spindle and rollers for the block, employed in the present invention.

FIG. 5 is a fragmentary, enlarged, elevation section view of the conveyor structure illustrated in FIG. 1, taken along the line 5—5 thereof, and looking in the direction of the arrows.

FIG. 6 is an elevation perspective view of the conveyor structure of FIG. 5.

DESCRIPTION OF THE PREFERRED EMBODIMENT

Figure 1:
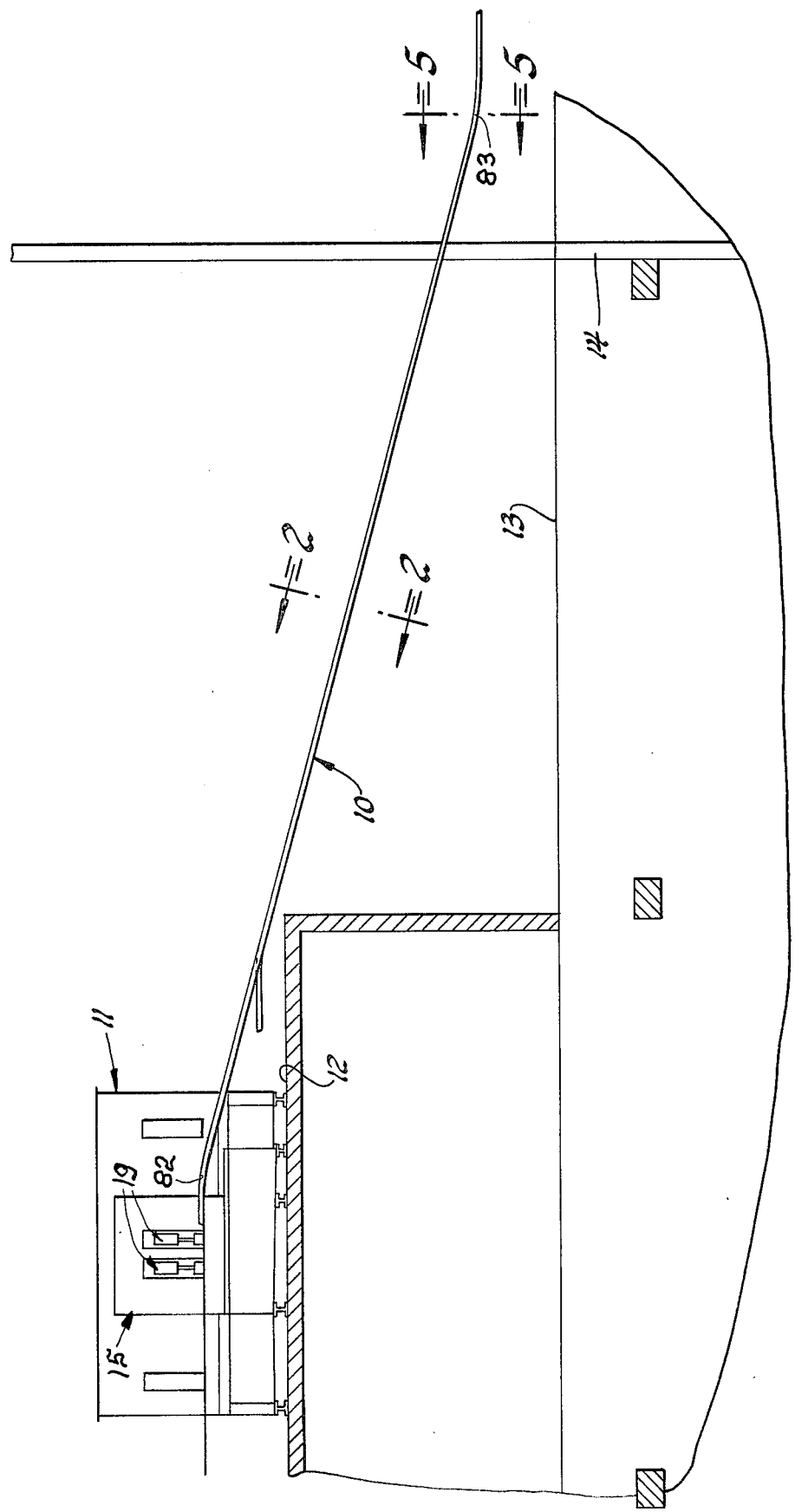
FIG. 1 is a fragmentary view of the end portion of an oil filter paint system conveyor embodying the principles of the present invention.

Referring now to the drawings, and in particular to FIG. 1, the numeral 10 generally designates a spindle conveyor made in accordance with the principles of the present invention, and which is adapted to be employed in a paint system as, for example, a system for conditioning and painting automobile engine oil filter housing workpieces 19. The conveyor 10 would carry the oil filter workpieces 19 through various processing stations as, for example, a washer station, generally indicated by the numeral 15 in FIG. 1, and then through a paint booth station, generally indicated by the numeral 11, and then through a bake oven booth, and a cooling chamber, after which the oil filter housing workpieces are unloaded from the conveyor 10. The numeral 12 designates a balcony on which the washer booth 15 and the painting booth 11 are mounted in the illustrative paint system. The conveyor 10 carries the oil filter workpieces 19 from the ground level or floor line 13 up to the balcony 12 for the various operations, and then back down to the floor line 13. The numeral 14 generally indicates the outside building wall of the building containing the paint system.

Figure 2:
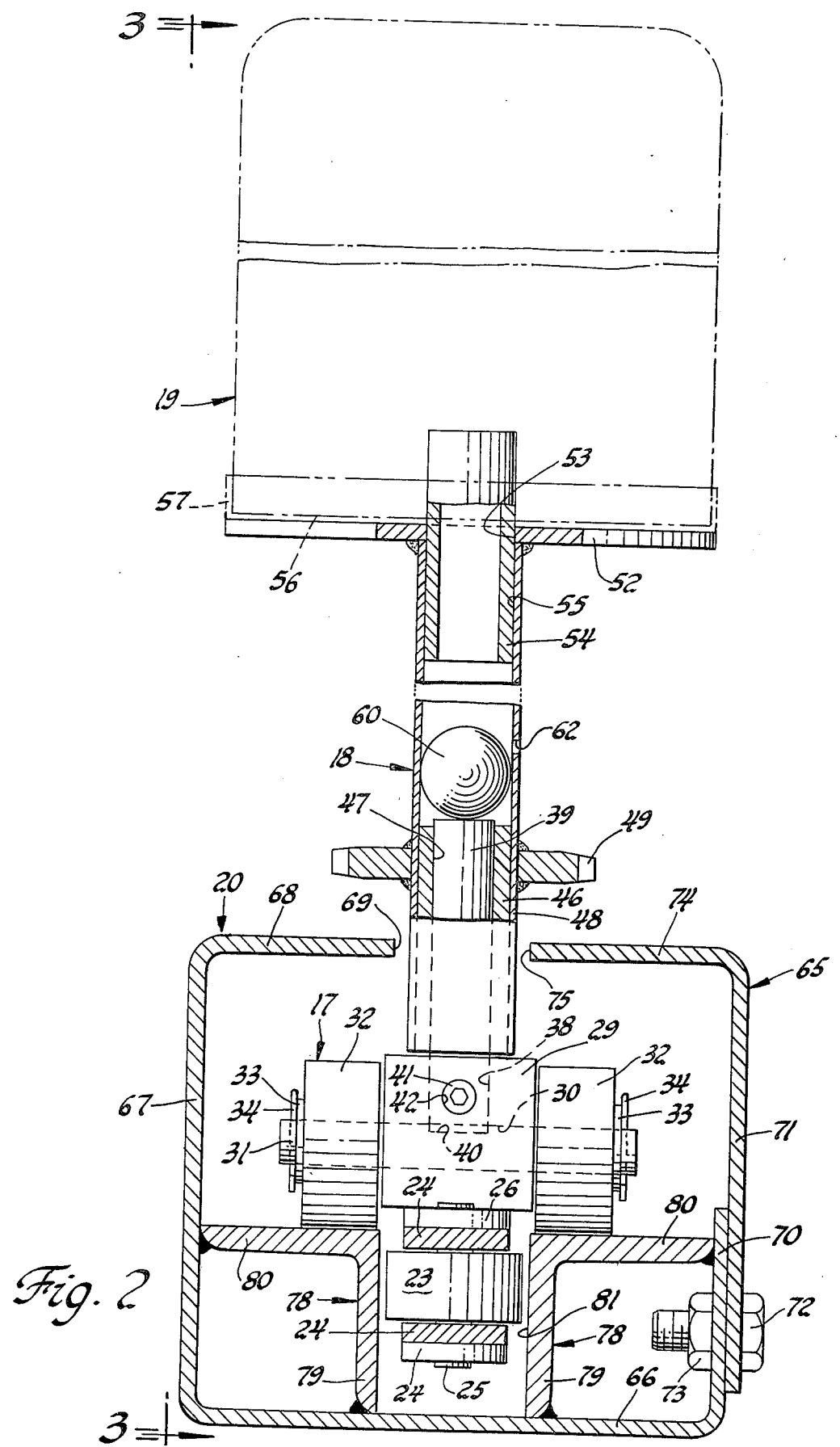
FIG. 2 is an enlarged, elevation section view of the conveyor structure illustrated in FIG. 1, taken along the line 2—2 thereof, and looking in the direction of the arrows.

As shown in FIG. 2, the spindle conveyor 10 includes a conveyor chain, generally indicated by the numeral 17, which may be of any suitable type as, for example, a circular pitch plain chain with wide side bars or links 24. The conveyor chain 17 is adapted to carry a plurality of spaced apart spindle type workpiece holders, generally indicated by the numeral 18, and made in accordance with the principles of the present invention. Each of the workpiece holders 18 supports an oil filter workpiece, generally indicated by the numeral 19, which in the present instance would be an oil filter cover or housing for an automobile engine oil filter. As shown in FIG. 2, the conveyor 17 is enclosed in a conveyor chain and guide means, generally indicated by the numeral 20, for maintaining the conveyor chain clean and also for supporting and guiding the conveyor chain 17.

Figure 3:
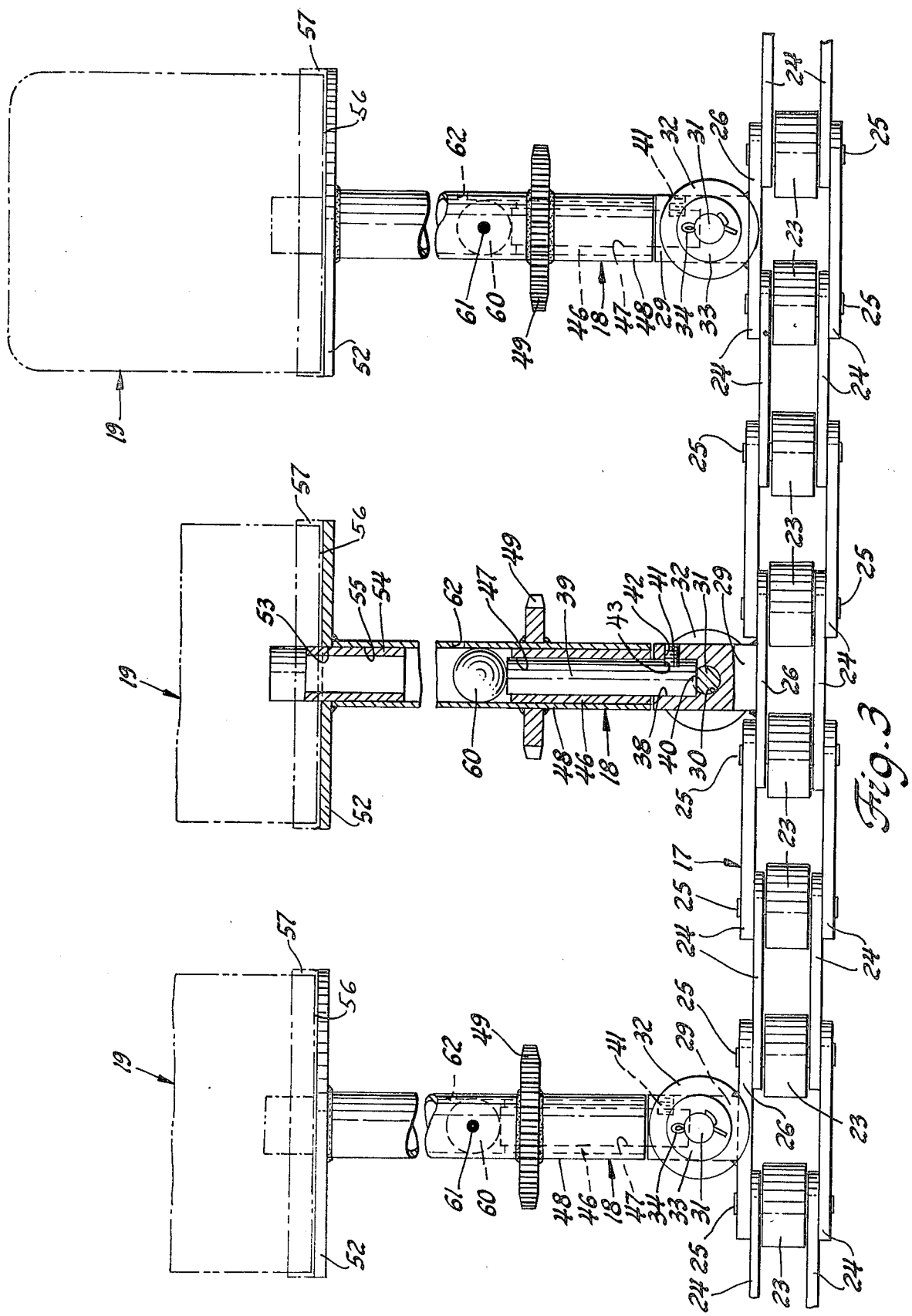
FIG. 3 is a fragmentary, broken, side elevational view of the conveyor structure illustrated in FIG. 2, with parts broken away and parts in section, taken along the line 3—3 of FIG. 2, and looking in the direction of the arrows.

As shown in FIG. 3, the conveyor chain 17 includes a plurality of horizontally disposed chain guide rollers 23 which are rollably carried on conventional chain pins 25. The chain pins 25 are connected by conventional chain links or plates 24 in the usual manner. As shown in FIG. 3, every third top chain link is indicated by the numeral 26, and it has attached thereto a carrier block 29. The carrier blocks 29 are secured to their chain links 26 by any suitable means, as by welding. As best seen in FIG. 4, each of the carrier blocks 29 is provided with a transverse, horizontal bore 30 through which is mounted a roller shaft 31. A steel roller 32 is rollably mounted on each outer end of the roller shafts 31. The rollers 32 are retained on their respective shaft 31 by suitable washers 33, and cotter keys 34 which extend through suitable holes 35 formed through the shaft 31 at a position outboard of the adjacent washer 33.

As shown in FIG. 2, the carrier block 29 is provided with a vertical bore 38 which communicates at its inner end with the transverse bore 30. A vertically disposed spindle pivot shaft 39 is mounted in the bore 38 in the carrier block 29, and the lower flat end thereof is extended into the bore 38 and is seated on the inner surface of a flat recess 40 that is formed centrally on the roller shaft 31. As shown in FIGS. 3 and 4, each of the spindle pivot shafts 39 is secured in the last described position by a suitable set screw 41 which is threadably mounted in a threaded bore 42 formed through the carrier block 29, and which has its inner end seated in a bore 43 formed in the lower end of each of the spindle pivot shafts 39.

As shown in FIG. 2, each of the workpiece holders of the present invention includes a holder spindle 48 which is an elongated cylindrical tubing member that has an inner bore 55, in the lower end of which is fixedly mounted, as by a press fit, a tubular bushing 46. The bushing 46 is adapted to rotatably receive in its bore 47 the upper end of one of the spindle pivot shafts 39. A ball bearing 60 is seated in each of the holder spindles 48, in an intermediate longitudinal position, and it is fixed to the holder spindle 48 by any suitable means, as by welding 61 shown in FIG. 3. A hole is drilled through each of the opposite sides of the spindle 48, and it is filled with weld which secures the ball 60 to its respective spindle 48. As shown in FIGS. 2 and 3, a sprocket 49 is mounted on each of the holder spindles 48 at an intermediate longitudinal position, and it is secured thereto by any suitable means, as by welding. A drain hole 62 is formed through the wall of each spindle 48, adjacent the ball 60.

As shown in FIG. 2, each of the holder spindles 48 has fixedly mounted on the top end thereof, by any suitable means, as by welding, a circular carrier plate 52. Each of the circular plates 52 has a central bore 53 formed therethrough which communicates with the bore 55 in the spindle 48. The carrier plate 52 is adapted to support suitable fixtures for carrying workpieces, such as the oil filter housing workpiece 19. The workpiece fixture for carrying the workpieces 19 is shown as comprising a circular flat adaptor plate 56 which has fixedly mounted thereon and extending therethrough a central adaptor shaft 54. The adaptor shaft 54 has its lower end slidably mounted in the bore 55 in the holder spindle 48. The adaptor plate 56 is illustrated as having an integral peripheral plate or wall 57. It will be seen that the cylindrical oil filter housing workpiece 19 has it square end seated on the plate 56, and its circular outer periphery seated in sliding engagement with the inner surface of the adaptor plate peripheral wall 57.

As shown in FIG. 2, the chain enclosure structure is generally indicated by the numeral 65, and it comprises a rectangular, tubular enclosure member which is made from two formed portions. A first one of the formed portions of the enclosure member 65 includes a bottom wall 66 which is integral at one end with a right angular side wall 67. Integrally attached to the upper end of the side wall 67 in an inwardly extended top wall 68 which terminates at the inner edge 69. Said first formed enclosure portion further includes a partial vertical side wall 70 which is integrally attached to the other end of the bottom wall 66. The second one of the formed portions of the enclosure member 65 includes a vertical flange 71 which is secured to the flange 70 by suitable machine screws 72 and nuts 73. Integrally formed on the upper end of the side wall 71 is an inwardly extended horizontal top wall 74 which terminates at the inner edge 75. The space between the top end wall inner edges 69 and 75 forms a longitudinal slot for the passage therethrough of the holder spindles 48.

The conveyor chain guide means includes a pair of spaced apart, elongated angle bar members, generally indicated by the numerals 78, which are disposed on opposite sides of the flow path of the conveyor chain rollers 23. As shown in FIG. 2, each of the angle bar chain guide members 78 includes a vertical guide flange 79 and an integral, outwardly extended, horizontal flange 80. The guide rollers 32 for the carrier block 29 ride on the top surfaces of the horizontal flanges 80, and the conveyor chain rollers 23 are mounted so as to move in the slot 81 formed between the vertical guide flanges 79. It will be seen, that the vertical guide fingers 79 prevent the conveyor chain 17 from swaying sidewards and tipping the workpieces 19 off the carrier plate 52. The clearance between the inner faces of the vertical guide flanges 79 and the rollers 23 may be made to any desired tolerance. The elongated angle bar members 78 are fixedly secured in their spaced apart positions in the tubular enclosure member 65 by any suitable means, as by welding.

FIGS. 5 and 6 illustrate the conveyor enclosure and guide structure for the spindle conveyor of the present invention for use at points in the conveyor line where a radius or change in elevation occurs. In the aforedescribed illustrative paint system, the washer, the ovens and the spray facilities are mounted on the balcony 12 above the main floor level 13. This is done to conserve main level floor space and to separate the finishing system from the other processes in the plant. The circular pitch chain employed in the chain conveyor of the present invention permits changes in elevation, and the maximum radius at a point where elevation is changed is about 15° maximum, with about an 8 to 10 foot radius on the vertical dip or rises, depending upon plant layout. The ability to have a spindle type conveyor which can move from one elevation to another allows the finishing system to be at a level of about 15 feet off the main floor level, and to have the conveyor extend down to a point about 3 feet off the floor level 13 where finished parts are unloaded and put in cartons and taken to the shipping area, and then unpainted or unprocessed parts are loaded on at that point and taken back up to the finishing system for coating. The conveyor structure of FIGS. 5 and 6 permit the conveyor to be formed with radii to permit such change of elevation, and comprises and following described structure.

The conveyor radius structure of FIGS. 5 and 6 maintains the chain guide rollers 23 down between the guide bars when the chain is making the vertical turns at the two points indicated by the numerals 82 and 83 in FIG. 1. The numeral 84 generally designates the conveyor radius or turn structure, and it includes an enclosure that comprises an arcuate base plate 83 to which is fixedly secured, as by welding, a pair of laterally spaced apart arcuate side plates 86. The enclosure for the spindle conveyor is completed by a pair of arcuate top cover plates 87 which are fixedly secured to the side plates 86 by any suitable means, as by welding. The inner edges 89 of the top cover plates 87 are spaced apart to form a slot through which the spindles 48 move. As shown in FIGS. 5 and 6, the base plate 83 is mounted on a plurality of longitudinally spaced apart transverse support bars 85 which are secured thereto by any suitable means, as by welding. As shown in FIGS. 5 and 6, the conveyor radius structure includes a plurality of vertically disposed stiffener plates 88 which are longitudinally spaced apart, and which have their upper ends seated under and against the lower face of the adjacent top plates 87, and the lower ends seated on the outer upper faces of the transverse support bars 85. The stiffener plates 88 are secured to the support bars 85, the side walls 86 and the top plates 87 by any suitable means, as by welding.

The conveyor radius structure of FIGS. 5 and 6 includes a conveyor roller guide means for guiding the roller chain rollers 23 which comprises a pair of vertically disposed, laterally spaced apart arcuate guide bars 92. The guide bars 92 are fixedly secured, as by welding, to the bottom plate 83. As illustrated in FIG. 6, the last described enclosure structure for the conveyor radius structure is arcuately curved in accordance with the desired angle of curvature for the vertical turn desired, and the roller guide bars 92 are similarly curved.

In order to prevent the roller chain rollers 23 from moving upwardly from out of the slot between the vertical guide bars 92, a pair of horizontally disposed arcuate roller guide plates 95 are mounted within the side walls 86, and they are fixedly secured thereto by any suitable means, as by welding. The guide plates 95 are arcuately curved to the same degree of curvature as the overall structure of the conveyor radius structure. The guide bars 92 are spaced apart to permit passage therethrough of the spindles 48 and the carrier blocks 29, and they are spaced downwardly from the enclosure top walls 87 by a plurality of longitudinally spaced apart suitable transverse bracket bars 96 which are fixedly secured in place, as by welding, to the top wall plates 87 and the side wall plates 86 and to the guide bars 95. It will be seen, that as the spindle conveyor is moved around and through the conveyor radius structures, that the carrier block guide rollers 32 will roll on the under surface of the arcuate roller guide plates 95, and prevent the conveyor chain rollers 23 from being moved upwardly out of the slot between the vertical guide bars 92.

It will be understood that the lower guide bars 92 and the upper guide plates 95 would extend outwardly beyond each end of the conveyor radius structure about one foot into straight sections of the conveyor housing made in accordance with the structure shown in FIG. 2. Accordingly, the guide angle bars 78 would be made about one foot shorter at the mating ends of the structure of FIG. 2 with the conveyor radius structure of FIG. 5.

In use, the oil filter workpieces 19 would be loaded on the workpiece holders 18 at the floor level 13, where they are carried upwardly through one of the conveyor radius structures 83, and then through a straight conveyor portion of the type illustrated in FIG. 2, and then through a second conveyor or radius structure 82, and then again into a horizontal conveyor portion structure, as shown in FIG. 2, which carries the workpieces through the various operations for cleaning the workpieces, the painting, drying and curing the paint coating on the oil filter housing workpieces 19. The conveyor includes a continuous return portion that is built in a similar manner to the structure of FIG. 1 to convey the finished workpieces 19 down to the floor level 13 in a continuous closed conveyor system. The sprockets 49 are adapted to be meshed with a suitable drive gear when the workpiece carriers 18 are moved through a paint spray booth, so as to rotate the workpieces for even distribution of the paint coating that is sprayed on the outer surface of the workpieces 19.

It will be seen that the conveyor structure of the present invention provides a spindle type conveyor system wherein the spindles 18 are moved in a positive manner without being tilted or the chain conveyor being jammed. The spindle conveyor of the present invention is adapted to maintain the workpiece carrying spindles 18 in a safe and positive work carrying position, regardless of the grade or elevation through which the conveyor is moved, without losing the workpieces 19 carried on the spindles 18. The workpieces 19 are not firmly attached to the spindles 18 because it is desired to be able to automatically load and unload the workpieces 19 from the spindles 18 at a desired load and unload station. The guide means provided in the conveyor of the present invention permits the carrying of the workpieces 19 on the top ends of the spindles 18 without the workpieces 19 wobbling and tipping off.

While it will be apparent that the preferred embodiment of the invention herein disclosed is well calculated to achieve the results aforestated, it will be appreciated that the invention is susceptible to modification, variation and change.

What is claimed is:

1. In a spindle conveyor system for use in high temperature applications, parts painting applications, spray washer applications, and the like, the combination comprising:
   (a) a movably mounted conveyor chain including a plurality of upper and lower horizontal chain plates that are connected by chain pins;
   (b) said conveyor chain being provided with guide roller means;
   (c) a plurality of carrier blocks which are each seated on, and fixedly secured to, the top side of an individual upper chain plate;
   (d) a workpiece spindle rotatably mounted on each of said carrier blocks and adapted to carry a workpiece holder fixture on the upper end thereof;
   (e) each of said carrier blocks having a horizontal shaft and a guide roller operatively mounted on each end of the shaft without the use of bearings; and,
   (f) guide means for guiding engagement with the conveyor chain guide roller means and the carrier block guide rollers.

2. A spindle conveyor system as defined in claim 1, including:
   (a) an elongated enclosure mounted around the conveyor chain, and enclosing the same and operatively supporting said carrier block guide rollers and being provided with a longitudinal slot formed through the upper side thereof for passage therethrough of the workpiece spindles.

3. A spindle conveyor system as defined in claim 2, wherein:
   (a) said conveyor chain guide roller means comprises a plurality of horizontal guide rollers which are each rotatably mounted on an individual chain pin that extends through a pair of upper chain plates and a pair of lower chain plates.

4. A spindle conveyor system as defined in claim 3, wherein:
   (a) each of said workpiece spindles is rotatably mounted on a pivot shaft which is detachably secured to the top side of each carrier block.

5. A spindle conveyor system as defined in claim 4, wherein:
   (a) the guide rollers for each carrier block each comprises a vertically disposed guide roller rotatably mounted on each side thereof for rotation about a horizontal axis.

6. A spindle conveyor system as defined in claim 5, wherein:
   (a) the guide means for the conveyor chain guide rollers comprises a pair of vertically disposed, spaced apart guide plates fixedly mounted in said elongated enclosure and forming a guide slot into which the conveyor chain guide rollers depend.

7. A spindle conveyor system as defined in claim 6, wherein:
   (a) the guide means for the carrier block guide rollers comprises a pair of horizontally disposed, spaced apart guide plates fixedly mounted in said elongated enclosure, below the carrier block guide rollers, and rollably engaged by the carrier block guide rollers.

8. A spindle conveyor system as defined in claim 7, wherein:
   (a) each of the workpiece spindles is provided with a peripheral gear for engagement with a means to rotate said gear for rotating each of the spindles on their respective pivot shafts.

9. A spindle conveyor system as defined in claim 7, wherein:
   (a) at points of curvature in the conveyor system the guide means for the conveyor chain guide rollers and the carrier block guide rollers are arcuately formed, and an arcuate pair of guide plates are spaced apart and fixedly mounted in the elongated enclosure above the carrier block guide rollers and they are rollably engaged by the carrier block rollers as they move through the points of curvature in the spindle conveyor system.

10. A spindle conveyor system as defined in claim 4, wherein:
    (a) each of said workpiece spindles is tubular and has a pivot ball fixedly mounted therein;
    (b) each of the workpiece spindles has a plurality of drain holes formed therethrough above the pivot ball; and,
    (c) the pivot ball in each workpiece spindle is seated on the upper end of the pivot shaft on which the spindle is mounted in a point contact therewith.